INVENTOR.
RICHARD T. BURNETT
BY Shelden L. Rajer
ATTORNEY

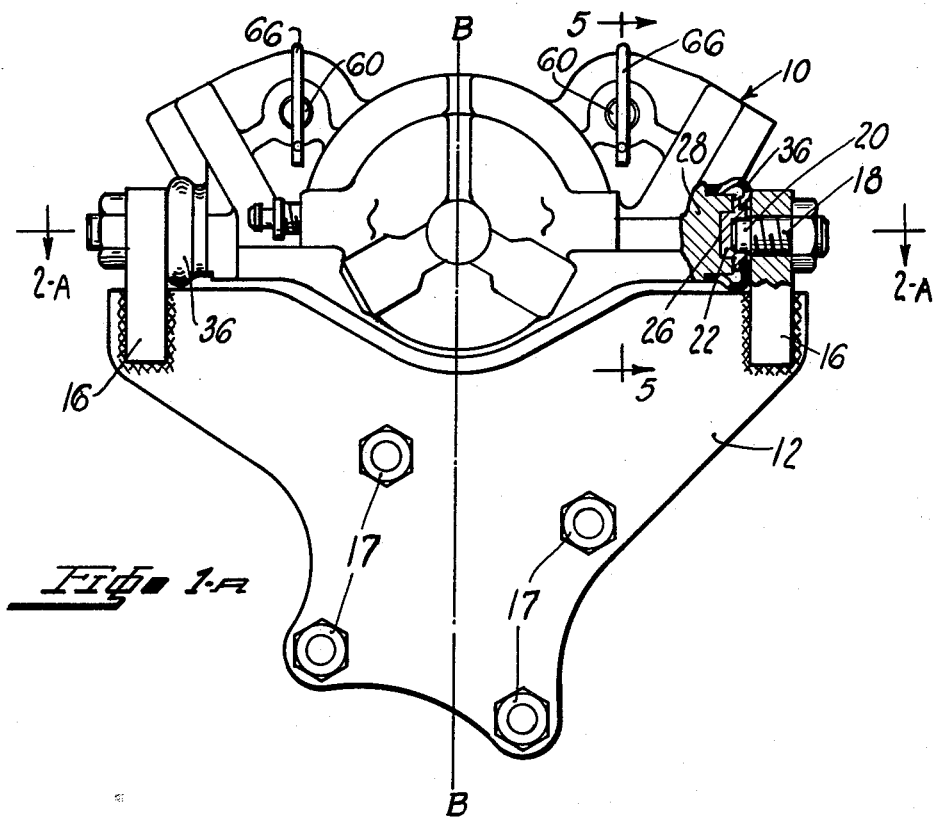
Fig. 1-A
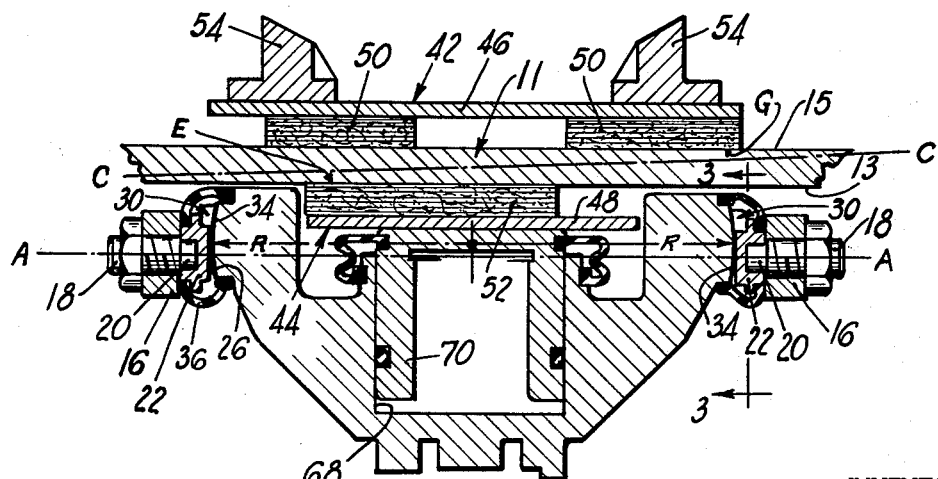
Fig. 2-A
INVENTOR.
RICHARD T. BURNETT
BY
*Sheldon F. Raizes*
ATTORNEY Jan. 19, 1965  R. T. BURNETT  3,166,157
SPOT TYPE BRAKE
Filed April 13, 1962  3 Sheets-Sheet 2
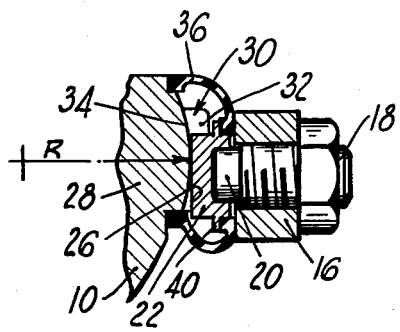
Fig. 2-B
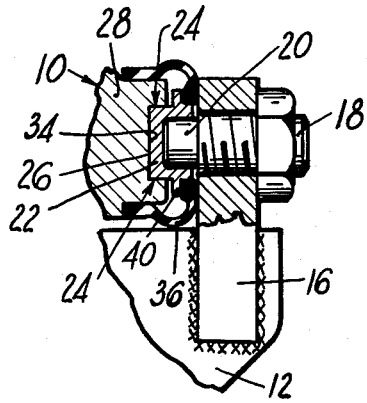
Fig. 1-B
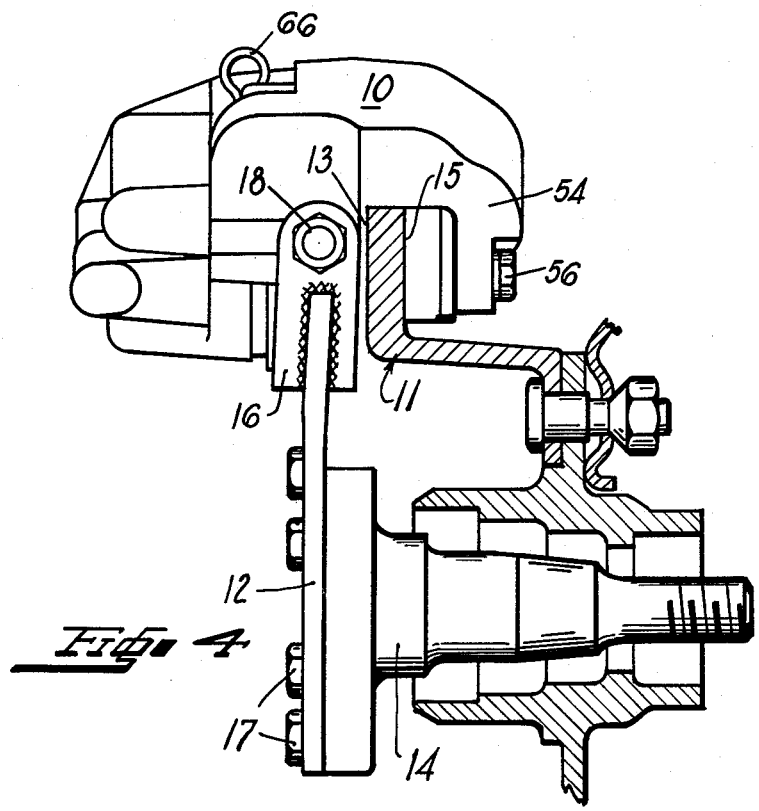
Fig. 4
INVENTOR.
RICHARD T. BURNETT
BY
Sheldon F. Raizes
ATTORNEY Jan. 19, 1965   R. T. BURNETT   3,166,157
SPOT TYPE BRAKE Filed April 13, 1962   3 Sheets-Sheet 3

United States Patent Office 3,166,157
Patented Jan. 19, 1965

3,166,157
SPOT TYPE BRAKE
Richard T. Burnett, South Bend, Ind., assignor to The Bendix Corporation, South Bend, Ind., a corporation of Delaware
Filed Apr. 13, 1962, Ser. No. 187,274
16 Claims. (Cl. 188—73)

This invention relates to a disk brake and more particularly, to a brake of the caliper type wherein the caliper is mounted on its support member in such a way that friction members are able to fully engage the rotor of the brake.

One of the disadvantages of many disk brakes is the brake shoes or friction members of the disc brake are not able to properly align themselves with the friction surface of the brake rotor resulting in uneven wear of the brake shoes, dragging, and twisting strain on the caliper the support and the connection between the caliper and support. To prevent as much as possible the above disadvantage, tolerances must be carefully watched and the brake must be carefully aligned when mounted on a vehicle; therefore resulting in an added expense which is substantial when considered with the total cost.

An object of this invention is to provide a brake which permits optimum alignment between friction members and a brake rotor.

One of the objects of the invention is to provide a disk brake which dispenses with many of the tolerances of manufacture heretofore necessary and which can be mounted to a vehicle with a decrease in many aligning problems previously encountered.

Another object of the invention is to provide a caliper disk brake wherein the caliper housing is pivotally mounted to its support about an axis generally parallel to the rotor friction faces and slidably mounted to its support for movement in a plane generally perpendicular to the rotor friction faces.

Still another object of the invention is to provide a caliper disk brake wherein the housing is not only pivotally mounted to its support member for pivotal movement about an axis generally parallel to the plane of the rotor friction faces but is also slidably and rockably mounted to the support member whereby the caliper housing can rock in a plane generally perpendicular to the rotor friction surfaces and about an axis generally parallel to the plane of the rotor friction faces.

A still other object of the invention is to provide a connection between two body members wherein one member may be slidably and pivotally connected to the other body member.

A further object of the invention is to provide two body members with a connection wherein one body member may be slidably, rockably and pivotally connected to the other body member.

An overall object of this invention is to provide a caliper brake, which is simple in construction and economical to manufacture, including means for allowing full engagement of the brake shoe or friction members with the friction surface of the rotor and still maintain efficient braking.

A full understanding of the invention may be had from the following detailed description with reference to the accompanying drawings, wherein:

FIGURE 1A is an elevational front view of the caliper brake partially cut away to illustrate the feature of the invention;

FIGURE 1B is an enlarged view in section of the cut away section of FIGURE 1A;

FIGURE 2A is a view taken along section line 2—2 of FIGURE 1A;

FIGURE 2B is an enlarged view taken along section line 2—2 of the cut away section of FIGURE 1A;

FIGURE 4 is a side elevational view of FIGURE 1A;

Figure 5:
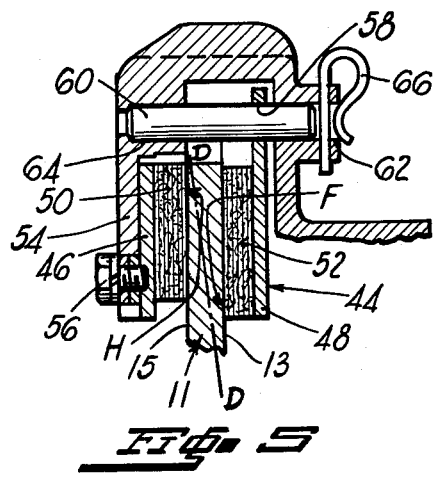
FIGURE 5 is a view taken along section line 5—5 of FIGURE 1A.
Figure 3:
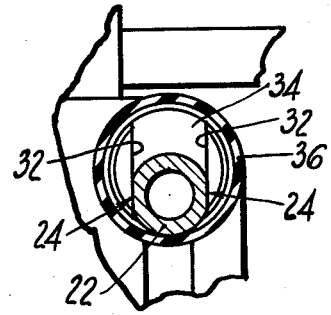
FIGURE 3 is a view taken along section line 3—3 of FIGURE 2A.
Figure 7:
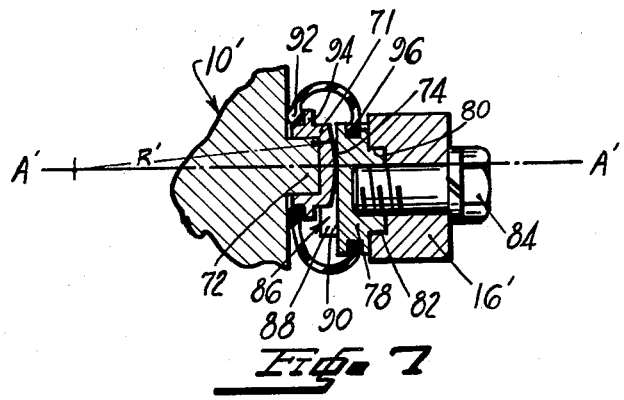
FIGURE 7 is a plan view in section of the embodiment illustrated in FIGURE 6.

Referring to FIGURES 1A–5, a caliper housing 10 is mounted on a support bracket 12 which is in turn mounted by bolts 17 to a stationary part of the vehicle which may be, for example, a spindle 14. The caliper housing 10 straddles a rotor 11 having friction faces 13 and 15 thereon. The support bracket 12 has ears 16, which may be connected thereto by any suitable construction or be formed as an integral part thereof, projecting therefrom and receiving a threaded bolt 18 extending therethrough. The inner end 20 of the bolt 18 is smooth and forms a bearing surface for a bearing member 22 which is rotatable about an axis A—A. The rotatable bearing member 22 has flat sides 24 and an anchoring edge 26 transverse to the sides. A boss 28 is formed on the caliper housing 10 and has a slot 30 therein which has side faces 32 extending toward the rotor friction surfaces in a plane generally perpendicular to the plane of the rotor friction faces for slidably engaging the flat sides 24 of the bearing member 22. The bottom surface 34 of the slot 30 is convexly shaped and circumscribes an arc of a given radius R and slidably and rockably engages and anchors on the surface 26 of the bearing member 22. Thus, it can be seen, the housing and bearing member are rotatable or rockable as a unit about the bolt 18 and therefore axis A—A, and the housing is slidable in a direction generally perpendicular to the rotor friction faces relative to the bearing member 22 and bolt 18 and therefore the support bracket 12. Due to the convexly shaped surface 34 the housing 10 can rock in a plane generally perpendicular to said rotor friction surfaces and about an axis B—B generally parallel to the rotor friction surfaces.

To minimize friction in pivotal movement between the bolt 18 and bearing member 22 and in sliding between bearing 22 and the slot 30 of the housing, it is desired that the connection between the housing and the support bracket be thoroughly lubricated at all times and be protected from contaminates. Therefore a boot 36 is provided to encompass the connection and is attached to boss 28 of the housing and between a flange 40 on the bearing member 22 and the ear 16 of the support bracket. The boot 36 will prevent loss of lubricant and prevent contaminates from collecting in the connection.

To prevent rattling of the housing on the support member, the bearing member 22 is axially adjustable along its axis of rotation to provide for a snug and yet loose enough fit for a slidable connection between the surfaces 26 and 34. Axial adjustment of bearing member 22 is effected by rotation of bolt 18.

A pair of brake shoes 42 and 44 are carried by the housing 10 and are disposed on each side of the rotor 11 for engagement therewith. The brake shoes 42 and 44 comprise a backing plate 46 and 48, respectively, and friction linings 50 and 52 attached to their respective backing plates. The brake shoe 42 is rigidly connected to legs 54 of the housing 10 by bolts 56 and the backing plate 48 has two openings 58 therein. Rods 60 extend through the openings 62 in the housing 10, openings 58 of the backing plate 48 and into openings 64 in the legs 54. A pin 66 is provided to retain each rod from axial movement. The brake shoe 44 therefore is slidably mounted on the rods 60 and therefore slidable relative to the housing 10. A chamber 68 of the housing 10 contains a piston 70 for actuating the brake through hydraulic pressure.

*Operation*

Upon actuation of the brake, the piston 70 will thrust brake shoe 44 against its respective rotor friction face 13 and then the hydraulic reaction will be transmitted back through the housing 10 whereby the housing will move axially relative to the support, with the surfaces 32 and 34 sliding relative to the surfaces 24 and 26 of the bearing member thereby bringing the other brake shoe 42 into engagement with its respective rotor surface 15. Assuming that the plane of the rotor is not perpendicular to its axis but is warped slightly and would tend to be in a plane designated by line C—C (FIGURE 2A), or line D—D (FIGURE 5), then without applicant's construction the lining 52 would engage the rotor mainly in the vicinity of E and F and the lining 50 would engage the rotor only in the vicinity of G and H. Thus, the linings will wear unevenly, utilization of the full lining surface in braking will not be achieved, and a twisting strain will be exerted by the rotor through the friction linings and backing plate to the housing 10 and its connection to the support plate 12. However, applicant's construction relieves the above since the housing can pivot or rock about axis A—A to align the housing and friction members vertically with the rotor friction faces and the housing can rock about the axis B—B to align the housing and friction members with the rotor friction faces horizontally thereby providing full engagement of the brake linings 44 and 46 with their respective rotor friction faces.

Figure 6:
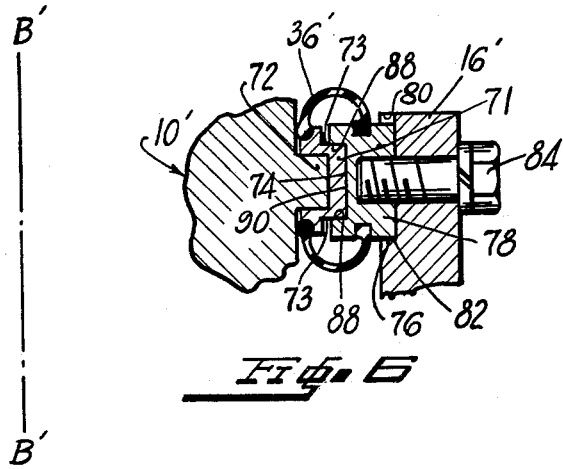
FIGURE 6 is a front view in section of a modified form of the invention.

Referring to a modified embodiment of FIGURE 6, the elements similar to the construction of the prior embodiment are designated by like reference numerals with prime marks affixed thereto.

A bearing member 71 rotatably fits over a boss 72 of the housing 10' and has a convexly shaped surface 74 circumscribing an arc of a given radius R' and flat sides 73. The ears 16' have a slot 76 for receiving a bearing guide 78. The side surfaces 80 of the slot 76 and edges 82 of the bearing guide member 78 coact to prevent pivoting movement of the guide 78. A bolt 84 holds the bearing guide 78 in position. The bearing guide has a notch 86 comprising flat side edge surfaces 88 and a flat bottom surface 90. The flat sides 73 of the bearing member 71 slidably engage surfaces 88 of the guide member 78 and the convexly shaped surface 74 of the bearing member and slidably and rockably engages and anchors on the bottom flat surface 90 of the guide member. Thus, the housing 10' is rotatable or rockable relative to the bearing member 71, the guide member 78, and the ear 16'; and the housing 10' and bearing member 71 are slidable and rockable as a unit relative to the guide member 78 and ear 16'.

A seal 36' encompasses the bearing member 71 and boss 72 and has an annular end 92 confined between the housing 10' and a flange 94 of the bearing member 71 and its other annular end 96 confined within an annular groove 96 in the guide member.

The operation of the modified embodiment is the same as the previous embodiment with the housing 10' being pivotable about axis A'—A', which is movable relative to the support member but is fixed on the housing, pivotable about axis B'—B', and slidable in a plane substantially perpendicular to the plane of the rotor friction faces upon actuation of the brake.

It will be apparent that the objects heretofore enumerated as well as others have been achieved. While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a disk brake: a rotor having friction faces thereon, a housing straddling said rotor, support means, bearing means, said bearing means being connected to said housing for relative rotation therebetween about an axis generally parallel to said rotor friction faces, means for slidably securing said bearing means to said support means for transverse movement relative to said support means toward and away from said rotor friction faces and for rockably connecting said bearing means to said support means for rocking movement of said housing and bearing means as a unit on said support means about an axis generally parallel to the plane of said rotor friction faces and generally perpendicular to said first mentioned axis.

2. In a disk brake: a rotor having friction faces thereon, a housing straddling said rotor, support means having two circumferentially spaced portions, said housing having two circumferentially spaced portions each opposing a respective one of said circumferentially spaced portions on said support means thereby providing two sets of opposing portions, a bearing member mounted on one of said opposing portions of each set for relative rotation therebetween about an axis generally parallel to the plane of said rotor friction surfaces, a slot in the other of said opposing portions of each set, the side faces of said slots extending toward said rotor friction faces, said bearing members being received within said slots and having generally flat sides engaging the side faces of said slots thereby providing a slidable connection between said flat sides of said bearing members and the side faces of said slots for movement in a direction generally perpendicular to the plane of said rotor friction faces and providing a rotatable connection between said housing and said support means, said slots having a bottom surface, said bearing members having a surface engaging said bottom surface, one of said surfaces being generally flat and the other of said surfaces being convexly shaped whereby said housing can rock on said support means about an axis generally parallel to the plane of said rotor friction faces and generally perpendicular to the first mentioned axis.

3. The structure as recited in claim 2 wherein said slots are located on said support means.

4. The structure as recited in claim 2 wherein said slots are located on said housing.

5. The structure as recited in claim 2 further including means for axially adjusting said bearing means along its axis of rotation.

6. The structure as recited in claim 2 further including sealing means extending between said housing and support means and encompassing said bearing means.

7. In a disk brake: a rotor having friction faces thereon, a housing straddling said rotor, support means, two circumferentially spaced bearing members rotatably mounted on said support means about an axis generally parallel to the plane of said rotor friction faces, said housing having a slot at a respective one of a pair of circumferentially spaced portions thereof, the side faces of each said slot extending toward said rotor friction faces, said bearing members being received within a respective one of said slots and having generally flat sides engaging the side faces of said slots thereby providing a slidable connection between said flat sides of said bearing members and the side faces of said slots of said housing for movement toward and away from said rotor friction faces and providing a rotatable connection of said housing and bearing members as a unit on said support means.

8. The structure as recited in claim 7 further comprising: said slots each having a bottom surface which is convexly shaped, said bearing members each having a generally flat surface engaging said convexly shaped surface whereby said housing can rock on said support about an axis generally parallel to the plane of said rotor friction faces and generally perpendicular to said first mentioned axis.

9. In a disk brake: a rotor having friction faces thereon, a housing straddling said rotor, support means, a bearing member mounted on a respective one of a pair of circumferentially spaced portions of said housing for relative rotation therebetween about an axis generally parallel to the plane of said rotor friction faces, said support means having two circumferentially spaced slots each facing a respective one of said circumferentially spaced portions of said housing, the side faces of said slots extending toward said rotor friction faces, each said bearing member being received within a respective one of said slots and having generally flat sides engaging the side faces of said slots thereby providing a slidable connection between said flat sides of said bearing members and the side faces of said slots of said support means for movement in a direction generally perpendicular to the plane of said rotor friction faces and providing a rotatable connection of said housing about the bearing members and said support means, said slots each having a generally flat bottom surface, said bearing members each having a convexly shaped surface engaging said flat bottom surface of said slots whereby said housing can rock on said support about an axis generally parallel to the plane of said rotor friction faces and generally perpendicular to said first mentioned axis.

10. In a disk brake: a rotor having friction faces thereon, a housing straddling said rotor, support means having two circumferentially spaced portions, said housing having two circumferentially spaced portions each opposing a respective one of said circumferentially spaced portions on said support means thereby providing two sets of opposing portions, a bearing member mounted on one of said opposing portions of each set for relative rotation therebetween about an axis generally parallel to the plane of said rotor friction faces, an aperture in the other of said opposing portions of each set, said bearing members being received within said apertures, said apertures having a bottom surface, said bearing members having a surface engaging said bottom surface, one of said surfaces being generally flat and extending toward said rotor friction faces and the other of said surfaces being convexly shaped whereby said housing can rock on said support means about an axis generally parallel to the plane of said rotor friction faces and generally perpendicular to the first mentioned axis and said housing can rotate relative to said support means.

11. The structure as recited in claim 10 wherein said apertures are located on said support means.

12. The structure as recited in claim 10 wherein said apertures are located on said housing.

13. In a disk brake: a rotor having friction faces thereon, a housing straddling said rotor, support means, rotatable means, said rotatable means being rotatably connected to said support means about an axis generally parallel to said rotor friction face, means for slidably securing said housing to said rotatable means for transverse movement relative to said rotatable means toward and away from said rotor friction faces and for rockably connecting said housing to said rotatable means for rocking movement of said housing relative to said rotatable means and said support means about an axis generally parallel to the plane of said rotor friction faces and generally perpendicular to said first named axis.

14. In a disk brake: a rotor having friction faces thereon, a housing straddling said rotor, support means having two circumferentially spaced portions, said housing having two circumferentially spaced portions each opposing a respective one of said circumferentially spaced portions on said support means thereby providing two sets of opposing portions, a bearing member interposed between the opposing portions of each set and mounted on one of said opposing portions of each set for relative rotation therebetween about an axis generally parallel to the plane of said rotor friction faces, a slidable connection between said bearing members and the other of said opposing portions of each set for slidable movement of said housing in a direction generally perpendicular to the plane of said rotor friction faces, an anchoring surface on each bearing member, an anchoring surface on said other of said opposing portions of each set and engaging said anchoring surface on its respective said bearing member, said anchoring surfaces extending in a direction which is transverse to said axis, whereby said housing anchors on said support means through said bearing members and rocks about said support means.

15. The structure as recited in claim 14 wherein said bearing members are rotatably mounted on said support means.

16. The structure as recited in claim 14 wherein said bearing members are rotatably mounted on said housing.

References Cited by the Examiner

UNITED STATES PATENTS

| 2,533,186 | 12/50 | Bricker et al. | 188—73 |
| 2,575,578 | 11/51 | Bricker | 188—72 X |
| 2,591,624 | 4/52 | Siebels | 287—100 |
| 2,596,401 | 5/52 | Hines | 269—71 X |
| 2,654,303 | 10/53 | Sawyer | 287—100 X |
| 2,657,772 | 11/53 | Chamberlain | 188—73 X |
| 2,731,712 | 1/56 | Laux | 269—71 |
| 2,784,811 | 3/57 | Butler | 188—152.873 |
| 2,921,651 | 1/60 | Myers | 188—73 |
| 2,996,308 | 8/61 | Cislo | 308—72 X |

FOREIGN PATENTS

| 730,053 | 5/55 | Great Britain. |
| 566,632 | 4/58 | Belgium. |
| 1,129,639 | 9/56 | France. |
| 1,267,299 | 6/61 | France. |

ARTHUR L. LA POINT, *Primary Examiner.*

ABRAHAM G. STONE, EUGENE G. BOTZ, *Examiners.*